United States Patent
Koka et al.

(10) Patent No.: US 8,976,802 B2
(45) Date of Patent: Mar. 10, 2015

(54) PREDICTION-BASED SWITCH ALLOCATOR

(71) Applicant: Oracle International Corporation, Redwood City, CA (US)

(72) Inventors: Pranay Koka, Austin, TX (US); Herbert D. Schwetman, Jr., Austin, TX (US); Syed Ali Raza Jafri, West Lafayette, IN (US)

(73) Assignee: Oracle International Corporation, Redwood Shores, CA (US)

( * ) Notice: Subject to any disclaimer, the term of this patent is extended or adjusted under 35 U.S.C. 154(b) by 176 days.

(21) Appl. No.: 13/840,085

(22) Filed: Mar. 15, 2013

(65) Prior Publication Data
US 2014/0269751 A1    Sep. 18, 2014

(51) Int. Cl.
*H04L 12/28*    (2006.01)
*H04L 12/863*    (2013.01)

(52) U.S. Cl.
CPC .................................. *H04L 47/6205* (2013.01)
USPC ........... 370/413; 370/419; 370/422; 370/427; 370/380; 370/386

(58) Field of Classification Search
None
See application file for complete search history.

(56) References Cited

U.S. PATENT DOCUMENTS

| | | | |
|---|---|---|---|
| 6,826,186 B1 * | 11/2004 | Dittia et al. | 370/395.31 |
| 7,016,350 B2 * | 3/2006 | Piekarski et al. | 370/390 |
| 7,023,844 B2 * | 4/2006 | Wolrich et al. | 370/388 |
| 7,706,361 B2 * | 4/2010 | McMillen et al. | 370/388 |
| 8,081,646 B1 * | 12/2011 | Bishop et al. | 370/413 |
| 2006/0020769 A1 * | 1/2006 | Herrell et al. | 712/13 |

* cited by examiner

*Primary Examiner* — Kibrom T Hailu
(74) *Attorney, Agent, or Firm* — Park, Vaughan, Fleming & Dowler LLP; Steven E. Stupp

(57) ABSTRACT

An arbitration technique for determining mappings for a switch is described. During a given arbitration decision cycle, an arbitration mechanism maintains, until expiration, a set of mappings from a subset of the input ports to a subset of the output ports of the switch. This set of mappings was determined during an arbitration decision cycle up to K cycles preceding the given arbitration decision cycle. Because the set of mappings are maintained, it is easier for the arbitration mechanism to determine mappings from a remainder of the input ports to the remainder of the output ports without collisions.

20 Claims, 5 Drawing Sheets

PREDICTION-BASED SWITCH ALLOCATOR

BACKGROUND

1. Field

The present disclosure generally relates to techniques for determining input-output mappings for a switch. More specifically, the present disclosure relates to an arbitration technique that maintains mappings from a preceding arbitration decision cycle.

2. Related Art

On-chip and inter-chip routers accept flits (the logical fragments of a packet) from incoming on-chip network links, examine the destinations of these flits and route them through the appropriate outgoing on-chip network links. A canonical router includes of a set of input ports to accept the incoming flits, a set of output ports to issue the outgoing flits, routing logic to determine the next hop for each flit, a crossbar or switch to transfer flits from the input ports to the output ports and a switch allocator which attempts to create a conflict-free schedule of flits to be transferred on each arbitration decision cycle. Moreover, blocking networks (i.e., networks that do not have an independent path from every source to every destination) typically rely heavily on router throughput for performance, especially at high loads.

Switch arbitration has a first-order impact on router throughput and the overall network performance. Typically, the switch allocator needs to maximize the number of flits transferred across the crossbar on each arbitration decision cycle while maintaining fairness among the input and output ports. However, this arbitration calculation is often non-trivial.

Furthermore, design of switch allocators can be complicated by additional factors. For example, current router designs usually use some form of input queuing (such as virtual channels) to mitigate head-of-line blocking. As a consequence, each input port may have flits from multiple input queues requesting different output ports. However, design and technology constraints often restrict an input port to transferring at most one flit per arbitration decision cycle, and an output port to accepting at most one flit per arbitration decision cycle. Therefore, the switch allocator typically must grant a subset of input port requests that maximizes the number of flits transferred without violating the above constraints and, at the same time, maintain fairness among the input and output ports.

In addition, in order to maximize the router throughput, the switch allocator often must be able to provide a set of matches in each arbitration decision cycle. However, at current clock speeds, the switch allocator usually cannot acquire a global snapshot of the input requests within a clock cycle and therefore must resort to distributed arbitration, in which the input and output ports act independently of each other and are agnostic of the decisions of the other input and output ports. In this approach, an input port is not aware of the requests submitted by the other input ports, nor is an output port aware of the grants issued by the other output ports. This distributed arbitration often causes conflicts in the port allocation, leading to wasted bandwidth on the output links.

For example, consider a scenario in which an input port A can submit requests to output ports X and Y, and input port B can only submit a request to X. If input ports A and B both submit requests for output port X, this results in either input port A or input port B losing an opportunity to transmit when input port A could have transferred a flit to output port Y and input port B could have transferred a flit to output port X in the same arbitration decision cycle. Arbitration collisions such as this typically limit the router throughput and, thus, the overall network performance at high injection loads. Therefore, it can be difficult for existing switch allocators to balance the conflicting requirements of reducing arbitration collisions while maintaining high throughput.

Hence, what is needed are a switch allocator and an arbitration technique that does not suffer from the above-described problems.

SUMMARY

One embodiment of the present disclosure provides an allocation circuit for a switch having N input ports and M output ports. This allocation circuit includes an arbitration mechanism. During a given arbitration decision cycle, the arbitration mechanism maintains, until expiration, a set of mappings from a subset of the N input ports to a subset of the M output ports, where the set of mappings were determined during an arbitration decision cycle up to K cycles preceding the given arbitration decision cycle, based on requests for the subset of the M output ports in flits associated with packets at the subset of N input ports. Moreover, the arbitration mechanism matches other flits associated with other packets at a remainder of the N input ports which include requests to a remainder of the M output ports so that the remainder of the N input ports is mapped to the remainder of the M output ports. This matching involves an arbitration technique and a solution space that is smaller than the N input ports and the M output ports.

Note that K may be 1, 2, 4 or 8.

Furthermore, the arbitration mechanism may be implemented using a pipeline.

In some embodiments, the arbitration mechanism includes: a set of N input arbiters associated with the N input ports; and a set of M output arbiters associated with the M output ports, where each input arbiter in the set of N input arbiters has a set of P requesting queues corresponding to the set of M output arbiters for the flit and the other flits. During the given arbitration decision cycle, the arbitration mechanism may determine a single flit from a group of the P requesting queues associated with the remainder of the M output ports for each of a group of the N input arbiters associated with the remainder of the N input ports. Moreover, the arbitration mechanism may select a single request from the other flits for each of a group of the M output arbiters associated with the remainder of the M output ports so that the remainder of the N input ports is mapped to the remainder of the M output ports. Note that the single request from the other flits for each of the group of the M output arbiters may be selected using a round-robin technique. Furthermore, the single flit from the group of the P requesting queues may be determined using a round-robin technique.

Additionally, the arbitration mechanism may include multiple queues corresponding to the M output ports. Alternatively, the arbitration mechanism may include virtual output queues corresponding to the M output ports.

Note that flits associated with a given packet may include requests for a given one of the M output ports.

In some embodiments, if, for a given one of the maintained mappings between a given input port and a given output port during the given arbitration decision cycle, there is not another flit at the given input port requesting the given output port, the arbitration mechanism provides an empty flit to the given output port or removes the mapping from the given input port to the given output port from the set of mappings.

Another embodiment provides the switch. This switch includes: the N input ports; the M output ports; a switching mechanism that selectively couples the N input ports to the M output ports based on mappings provided by the arbitration mechanism; and the arbitration mechanism.

Another embodiment provides a method for determining mappings for the switch. During the method, for the given arbitration decision cycle, the set of mappings from the subset of the N input ports to the subset of the M output ports are maintained, until expiration, where the set of mappings were determined during the arbitration decision cycle up to K cycles preceding the given arbitration decision cycle, based on requests for the subset of the M output ports in flits associated with packets at the subset of the N input ports. Moreover, other flits associated with other packets at the remainder of the N input ports which include requests to the remainder of the M output ports are matched so that the remainder of the N input ports is mapped to the remainder of the M output ports. Note that the matching involves an arbitration technique and the solution space that is smaller than the N input ports and the M output ports.

Figure 1:
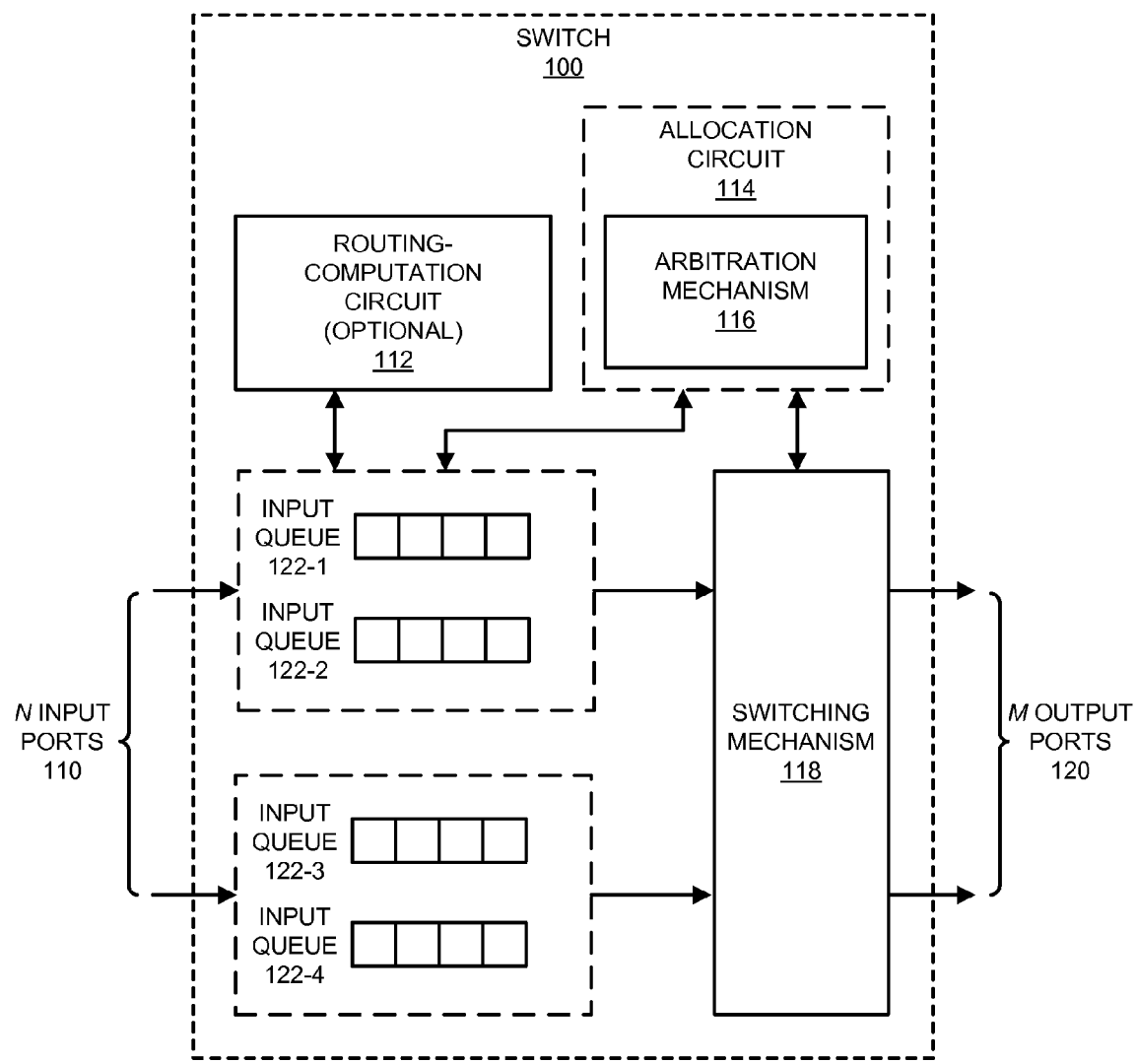
FIG. 1 is a block diagram illustrating a switch in accordance with an embodiment of the present disclosure.

Table 1 presents a switch-allocation timeline in accordance with an embodiment of the present disclosure.

Table 2 presents a switch-allocation timeline in accordance with an embodiment of the present disclosure.

Table 3 presents a switch-allocation timeline in accordance with an embodiment of the present disclosure.

Table 4 presents a switch-allocation timeline in accordance with an embodiment of the present disclosure.

Note that like reference numerals refer to corresponding parts throughout the drawings. Moreover, multiple instances of the same type of part are designated by a common prefix separated from an instance number by a dash.

DETAILED DESCRIPTION

Embodiments of an allocation circuit with an arbitration mechanism, a switch that includes the arbitration mechanism, and an arbitration technique for determining mappings for the switch are described. During a given arbitration decision cycle, the arbitration mechanism maintains, until expiration, a set of mappings from a subset of the input ports to a subset of the output ports of the switch. This set of mappings was determined during an arbitration decision cycle up to K cycles preceding the given arbitration decision cycle. Because the set of mappings are maintained, it is easier for the arbitration mechanism to determine mappings from a remainder of the input ports to the remainder of the output ports without collisions.

By introducing memory in the arbitration decision process, the prediction-based arbitration technique can improve router throughput (for example, up to 18%) while reducing arbitration collisions with low router latency. In addition, the arbitration technique can maintain a coarse level of fairness, and can be implemented using a pipeline with minor hardware modification relative to conventional arbitration techniques. Therefore, the arbitration technique can be used to achieve higher overall network performance.

We now describe embodiments of the switch (or router) and the arbitration mechanism. FIG. 1 presents a block diagram illustrating a switch 100. This switch has N input ports 110, an optional routing-computation circuit 112, an allocation circuit 114 with an arbitration mechanism 116, a switching mechanism 118 (such as a crossbar) that selectively couples N input ports 110 to M output ports 120 based on mappings provided by arbitration mechanism 116 (which is sometimes referred to as a 'switch allocator'), and M output ports 120.

In order to counter head-of-line (HOL) blocking, switch 100 may employ either virtual channels (VCs) or virtual output queuing (VOQ). Both VCs and VOQ may interleave flits from different packets to mitigate HOL blocking VCs may allocate an input queue (such as one of input queues 122) to a packet, so switch 100 writes the incoming flits of a particular packet to a specific input queue. Once the last flit of a packet has been transmitted, switch 100 can reallocate the input queue to a new packet. In embodiments where switch 100 uses VOQs, each of N input ports 110 has one queue (such as one of input queues 122) dedicated to each of M output ports 120. Flits arriving at an input port destined for a particular output port are written to the corresponding virtual input queue. Therefore, each input port in switch 100 may have flits from multiple input queues (VC or VOQs) requesting different output ports.

Switch 100, and in particular arbitration mechanism 116, leverages the observation that, in the presence of input queuing with long packets or VOQs, input queues 122 may have more than one flit in them. Moreover, because flits associated with a given packet may all include requests for a given one of M output ports 120, the flits in one of input queues 122 may be destined for the same output port. In these cases, when arbitration mechanism 116 makes an arbitration decision mapping a pair of input and output ports, it can successfully reuse the same decision for the next few arbitration decision cycles. (Note that these carried-forward decisions are, implicitly, contention free.) Therefore, during a given arbitration decision cycle, arbitration mechanism 116 maintains, until expiration, a set of mappings from a subset of the N input ports 110 to a subset of the M output ports 120, where the set of mappings were determined during an arbitration decision cycle up to K cycles preceding the given arbitration decision cycle, based on requests for the subset of output ports in flits associated with packets at the subset of the input ports. For example, K may be 1, 2, 4 or 8.

Furthermore, when a previous mapping is reused in an arbitration decision cycle, those input ports and output ports are removed from the arbitration decision process in that cycle. Thus, during the given arbitration decision cycle, arbitration mechanism 116 matches other flits associated with other packets at a remainder of the N input ports which include requests to a remainder of the M output ports so that the remainder of the N input ports is mapped to the remainder of the M output ports. This matching involves a solution space that is smaller than the N input ports 110 and the M output ports 120, i.e., it is simpler to solve without arbitration collisions than the full solution space. Therefore, the arbitration technique can reduce the probability of contention while improving the throughput. In principle, the arbitration technique offers efficiency at the expense of fairness (for example, there may be some starvation after a few arbitration decision cycles). This tradeoff can be addressed by keeping K small (such as less than 8).

As noted previously, the mappings created in each arbitration decision cycle (which are sometimes referred to as 'matches') have a preset lifetime. On the expiration of a mapping, the corresponding input and output ports are again considered by arbitration mechanism 116 in the arbitration decision process.

In some embodiments, if, for a given one of the maintained mappings between a given input port and a given output port during the given arbitration decision cycle, there is not another flit at the given input port requesting the given output port, arbitration mechanism 116 provides an empty flit (i.e., a bubble) to the given output port or removes the mapping from the given input port to the given output port from the set of mappings. With long packets, this wasted arbitration decision cycle may have minimal impact on the switch performance. Alternatively, the arbitration technique may be modified to use the flit status (such as a flag indicating the 'last flit in the packet') so that this mapping is not used (i.e., the associated input port and output port can be re-arbitrated for the given arbitration decision cycle).

In an exemplary embodiment, the flits are between 16 and 32 bits, and the packets have 8 B or between 64 B and 4000 B. Moreover, N may equal M.

The arbitration technique results in a modified canonical pipeline for switch 100. In a conventional switch, a canonical pipeline starts with buffer writing and routing, where the switch accepts incoming flits and writes them to a specific input queue. The switch also determines the next hop of the flit in this stage. Then, a switch allocator performs arbitration to create a schedule of flit transfers from the input ports to the output ports which is guaranteed to succeed (i.e., only a single flit is transferred from any input port, and only a single flit is transferred to any output port). Once the switch allocator has created the schedule, a crossbar actually transfers the flits from the input ports to the output ports. The output ports then dispatch the flits to their next destination.

Figure 2:
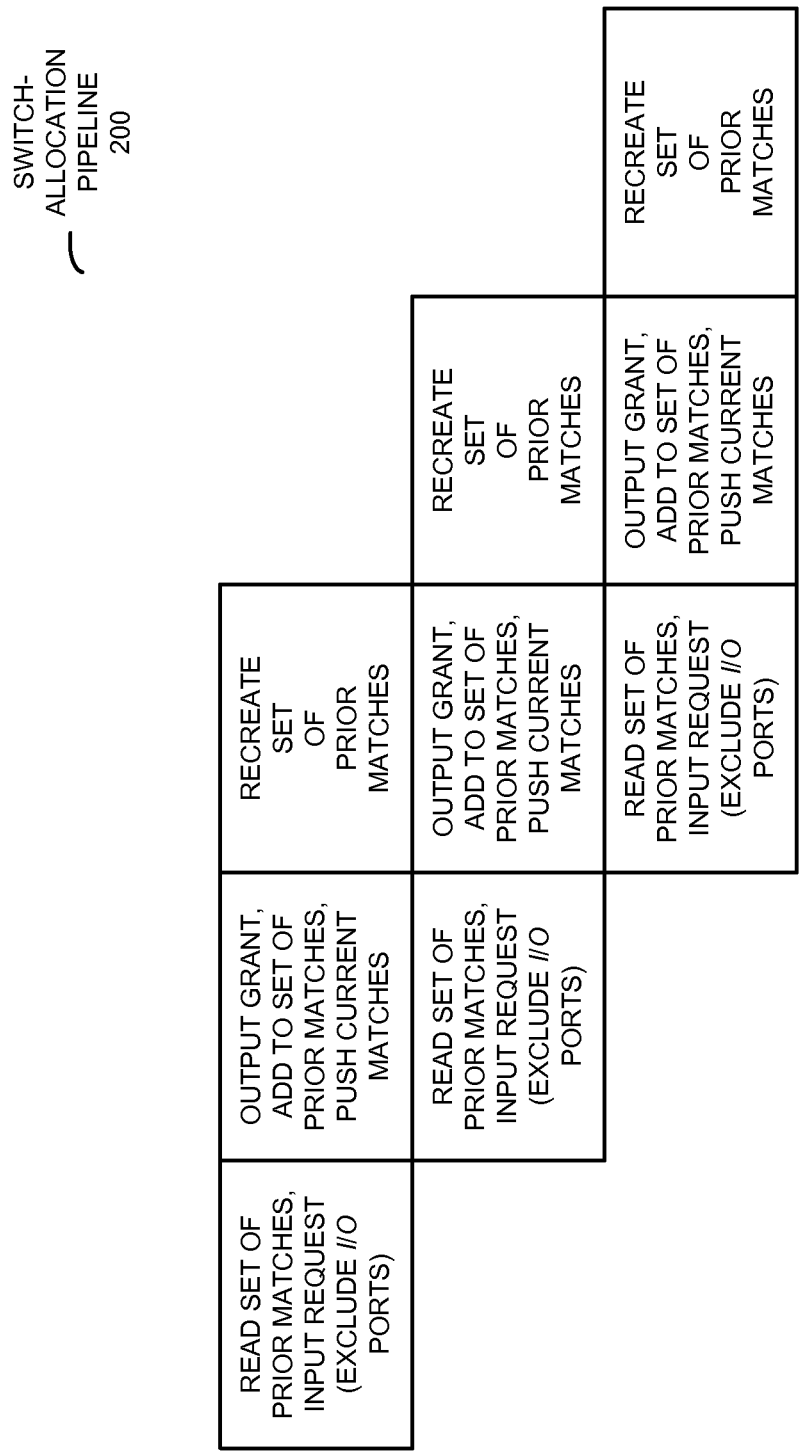
FIG. 2 is a block diagram illustrating a switch-allocation pipeline in accordance with an embodiment of the present disclosure.

In contrast, as shown in FIG. 2, which presents a block diagram illustrating a prediction-based switch-allocation pipeline 200, in each decision arbitration cycle, the input request phase reads the set of prior matches and excludes the participating input and output ports from the current switch arbitration process. In the next arbitration decision cycle, the output grant stage from arbitration mechanism 116 (FIG. 1) provides the output grants from the switch arbitration process initiated in the previous arbitration decision cycle and the set of prior matches read by the input request phase in the previous arbitration decision cycle. The output grant phase also pushes the newly created matches onto a first-in first-out (FIFO) queue. A third stage is included in which arbitration mechanism 116 (FIG. 1) scans the FIFO queue and creates a new set of prior matches. Note that the latency of arbitration mechanism 116 (FIG. 1) may be K arbitration decision cycles and matches may be available at the end of the output grant phase. As is shown in the pipeline in FIG. 2, each input request phase actually reads the set of prior matches created in the arbitration decision cycle before the previous arbitration decision cycle. This may not affect the performance of switch 100 (FIG. 1) as long as there are more than two flits in the input queues seeing traffic.

In the example that follows, the arbitration technique is illustrated in the context of a simple-pipelined-arbitration-algorithm (SPAA) switch allocator. However, in other embodiments the arbitration technique can be implemented using a wide variety of switch-allocator designs and/or arbitration techniques.

An SPAA switch allocator typically performs two arbitration operations: one across the input ports and the other across the outputs. In particular, in an SPAA switch allocator, each input port typically selects one request from its local input queues and submits this request to a corresponding output port. Moreover, each output port typically grants one request and informs the corresponding input port. This approach minimizes interaction between the input and output ports. Furthermore, in order to minimize the risk of mis-speculation due to the submission of stale requests, each input port usually tries to submit a request to a different input queue on each arbitration decision cycle.

Figure 3:
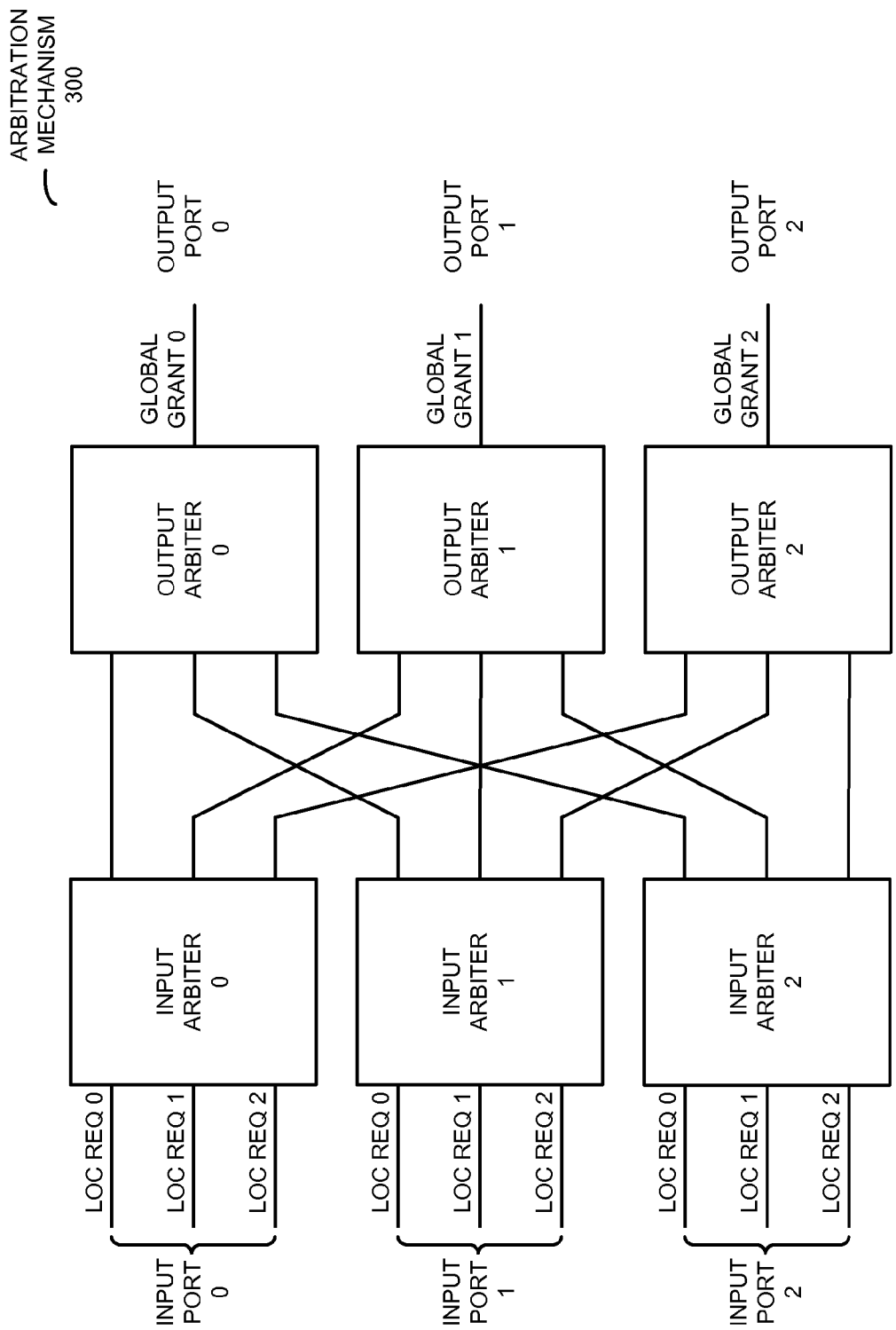
FIG. 3 is a block diagram illustrating an arbitration mechanism in accordance with an embodiment of the present disclosure.

Arbitration in an SPAA switch allocator is illustrated in FIG. 3, which presents a block diagram illustrating an arbitration mechanism 300. This arbitration mechanism may include: a set of N input arbiters associated with N input ports 110 in FIG. 1; and a set of M output arbiters associated with M output ports 120 in FIG. 1, where each input arbiter in the set of N input arbiters has a set of P requesting queues corresponding to the set of M output arbiters for the flit and the other flits. Note that for VCs, P need not be the same as M. However, in the case of VOQs, P equals M (i.e., there are M requesting queues for the M output ports).

During the given arbitration decision cycle, arbitration mechanism 300 may determine a single flit from a group of the P requesting queues associated with the remainder of the M output ports for each of a group of the N input arbiters associated with the remainder of the N input ports. The outputs from the group of the N input arbiters are sent to the group of the M output arbiters. Then, arbitration mechanism 300 may select a single request from the other flits for each of the group of the M output arbiters associated with the remainder of the M output ports so that the remainder of the N input ports is mapped to the remainder of the M output ports.

The result is that there is at most one request accepted from each of the N input ports 110 and for each of the M output ports 120 in FIG. 1. In practice, in order to maintain fairness, the single request from the other flits for each of the group of the M output arbiters and/or the single flit from the group of the P requesting queues may be determined using a round-robin technique. Furthermore, note that either of these operations may be performed in parallel. The simplicity of the design in FIG. 3 may allow for a pipelined implementation of arbitration mechanism 300 (as illustrated in FIG. 2).

Referring back to FIG. 1, in an exemplary embodiment the short-term memory needed to reuse the mappings made in the most recent arbitration decision cycles is implemented using a FIFO structure, each element of which can store the maximum number of mappings that may be created within a single arbitration decision cycle. Note that a single mapping may include an input port, an input queue and an output port. There may be as many mappings as the minimum of the number of input and output ports. At the end of each round of arbitration, arbitration mechanism 116 may push the set of mappings created into the FIFO structure. The FIFO structure may have a limited depth that implicitly determines the duration for which the mappings may be reused. As a consequence, older sets of mappings may be discarded in favor of newer sets of mappings. On starting a new round of arbitration (i.e., a new arbitration decision cycle), arbitration mechanism 116 may examine the mappings within each element of the FIFO queue. The input and output ports corresponding to these prior mappings may be removed from the current round of arbitration. Therefore, the size of the input to the current round of arbitration may be reduced, which may reduce the number of arbitration collisions. Then, the result of the current round of arbitration is combined with all the matches summarized from the FIFO queue and may be presented to the switch. Furthermore, the mappings that are actually determined by arbitration mechanism 116 in the current arbitration decision cycle may also be pushed into the FIFO queue.

Tables 1 through 4 illustrate switch-allocation timelines in the arbitration technique. These examples assume a non-pipelined implementation of the arbitration technique. Consider input ports A and B, which can send flits to output ports X, Y and Z. Table 1 depicts the working of an SPAA switch allocator. In this particular example, the input port arbiters move in lockstep, which reduces the throughput of switch 100. In arbitration decision cycle 0, both input ports A and B submit requests to output port X, and output port X grants the request from port A. Similarly, in arbitration decision cycle 1 both input ports A and B submit requests to output port Y, and in arbitration decision cycle 2 both input ports A and B submit requests to output port Z. Therefore, the requests from input port A are rejected in arbitration decision cycles 2, 3, 6 and 7, and the requests from input port B are rejected in arbitration decision cycles 0, 1, 4, 5 and 8.

TABLE 1

| Input | Cycle | | | | | | | | |
|---|---|---|---|---|---|---|---|---|---|
| | 0 | 1 | 2 | 3 | 4 | 5 | 6 | 7 | 8 |
| A | X | Y | Z | X | Y | Z | X | Y | Z |
| B | X | Y | Z | X | Y | Z | X | Y | Z |

The pathological case shown in Table 1 reduces the throughput of switch 100 by 50%. Table 2 shows how the arbitration technique resolves such a scenario.

TABLE 2

| Input | Cycle | | | | | | | | |
|---|---|---|---|---|---|---|---|---|---|
| | 0 | 1 | 2 | 3 | 4 | 5 | 6 | 7 | 8 |
| A | X | X | Z | Z | Y | Y | X | X | Z |
| B | X | Y | Y | X | X | Z | Z | Y | Y |

In Table 2, for arbitration decision cycle 0, both input ports A and B submit requests to output port X. The request from port A is granted through the switch arbitration process and arbitration mechanism 116 pushes the match between input port A and output port X on its single element FIFO queue. In arbitration decision cycle 1, input port A and output port X are excluded from the switch arbitration process, thus forcing input port B to submit a request to output port Y, which is granted. Then, arbitration mechanism 116 combines the match between input port B and output port Y with the match made in the previous arbitration decision cycle between input port A and output port X.

Arbitration mechanism 116 now pushes the currently made match between input port B and output port Y onto the single element FIFO, replacing the older match between input port A and output port X. In arbitration decision cycle 2, input port B and output port Y are excluded from the round of switch arbitration, and because this example uses a mapping lifetime K of one arbitration decision cycle, input port A now submits its request to output port Z, which is granted. Arbitration mechanism 116 combines this match with the match made in the previous arbitration decision cycle, and the process continues. As can be seen in Table 2, the arbitration technique greatly improves the throughput of switch 100. In particular, the previous match is used in staggered alternate arbitration decision cycles for input ports A and B, and the only rejected request is for input port B in arbitration decision cycle 0. Note that the arbitration technique may be extended to a switch with three or more input and output ports.

Having demonstrated that the arbitration technique improves the throughput of switch 100 in unfavorable scenarios, next we show that the arbitration technique does not degrade the throughput in a favorable scenario. Table 3 depicts the case where the input port arbiters of input ports A and B are favorably staggered, resulting in a 100% throughput of switch 100 (i.e., all requests are granted and no previous matches are used in subsequent arbitration decision cycles). Similarly, as shown in Table 4, the arbitration technique maintains the throughput of switch 100 at 100%, but loses fairness per arbitration decision cycle among the input and output ports (i.e., all requests are granted and previous matches are used in alternate arbitration decision cycles for input ports A and B). However, as long as the fairness is maintained at the level of a few arbitration decision cycles, the performance is expected to be improved.

TABLE 3

| Input | Cycle | | | | | | | | |
|---|---|---|---|---|---|---|---|---|---|
| | 0 | 1 | 2 | 3 | 4 | 5 | 6 | 7 | 8 |
| A | X | Y | Z | X | Y | Z | X | Y | Z |
| B | Y | Z | X | Y | Z | X | Y | Z | X |

TABLE 4

| Input | Cycle | | | | | | | | |
|---|---|---|---|---|---|---|---|---|---|
| | 0 | 1 | 2 | 3 | 4 | 5 | 6 | 7 | 8 |
| A | X | X | Y | Y | Z | Z | X | X | Y |
| B | Y | Y | Z | Z | X | X | Y | Y | X |

Note that the depth of the FIFO queue (which corresponds to the lifetime of the mappings K) represents the tradeoff between throughput and fairness. A deeper FIFO queue may result in the same input port transferring flits for more consecutive arbitration decision cycles. However, arbitrarily deepening the FIFO queue may create fairness-related performance degradation. In an exemplary embodiment, K is two arbitration decision cycles.

In simulations, the performance of the prediction-based switch allocator was evaluated using an on-chip network simulator. In particular, a 3×3 mesh network, which relies heavily on switch throughput, was modeled, and the performance of the prediction-based switch allocator was compared against a conventional SPAA switch allocator under uniform random traffic at varying injection rates. At the maximum limit of 200 arbitration-decision-cycle latency (as computed based on the time elapsed between creation of a data packet and the reception of the packet at the destination), the performance of the prediction-based switch allocator is 18% better than the conventional SPAA switch allocator.

Figure 4:
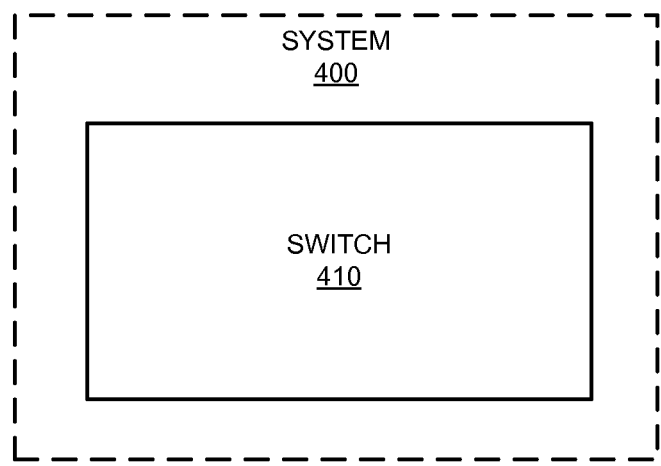
FIG. 4 is a block diagram illustrating a system in accordance with an embodiment of the present disclosure.

One or more of the preceding embodiments of the switch may be included in a system and/or an electronic device. This is shown in FIG. 4, which presents a block diagram illustrating a system 400 that includes switch 410.

Furthermore, embodiments of the switch may be used in a variety of applications, including: VLSI circuits, communication systems (such as in wavelength division multiplexing), storage area networks, data centers, networks (such as local area networks), and/or computer systems (such as multiple-core processor computer systems). For example, the switch may be included in a backplane that is coupled to multiple processor blades, or the switch may couple different types of components (such as processors, memory, input/output devices, and/or peripheral devices). In some embodiments, the switch performs the functions of: a hub, a bridge, and/or a router.

Note that system 400 may include, but is not limited to: a server, a laptop computer, a communication device or system, a personal computer, a tablet, a cellular telephone, a work station, a mainframe computer, a blade, an enterprise computer, a data center, a portable-computing device, a supercomputer, a network-attached-storage (NAS) system, a storage-area-network (SAN) system, and/or another electronic computing device. Moreover, note that a given computer system may be at one location or may be distributed over multiple, geographically dispersed locations.

In some embodiments, the switch and the arbitration mechanism in the preceding embodiments uses electrical and/or optical communication of information.

The switch and the arbitration mechanism in the preceding embodiments may include fewer components or additional components. Furthermore, although these embodiments are illustrated as having a number of discrete items, these switches, arbitration mechanisms and systems are intended to be functional descriptions of the various features that may be present rather than structural schematics of the embodiments described herein. Consequently, in these embodiments two or more components may be combined into a single component, and/or a position of one or more components may be changed.

Figure 5:
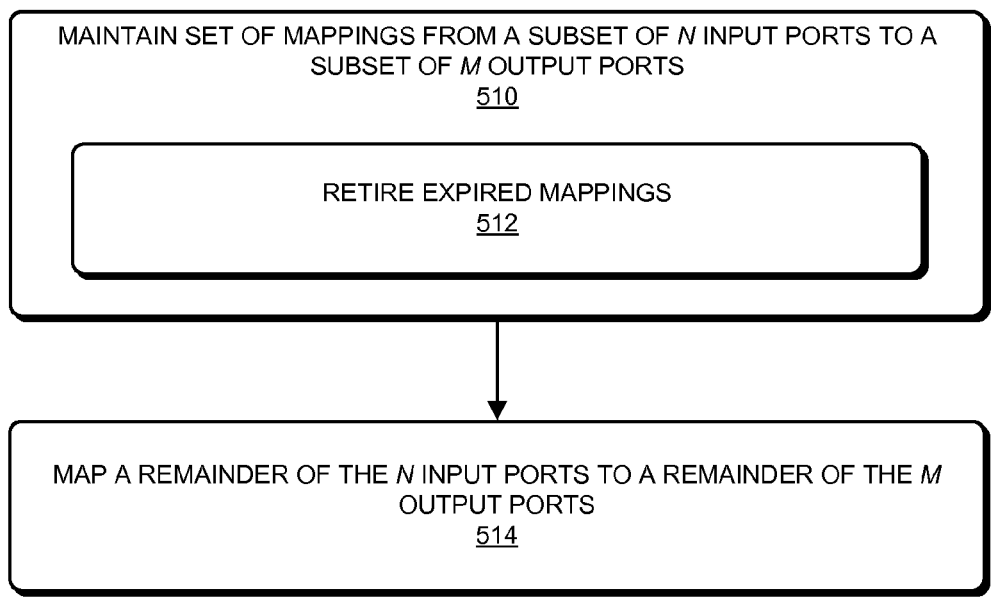
FIG. 5 is a flow chart illustrating a method for determining mappings for a switch in accordance with an embodiment of the present disclosure.

We now describe embodiments of a method. FIG. 5 presents a flow chart illustrating a method 500 for determining mappings for a switch, such as switch 100 in FIG. 1. During this method, for the given arbitration decision cycle, the set of mappings from the subset of the N input ports to the subset of the M output ports are maintained (operation 510), until expiration (when the mappings are retired) (operation 512), where the set of mappings were determined during the arbitration decision cycle up to K cycles preceding the given arbitration decision cycle, based on requests for the subset of the M output ports in flits associated with packets at the subset of the N input ports. Moreover, other flits associated with other packets at the remainder of the N input ports which include requests to the remainder of the M output ports are matched so that the remainder of the N input ports is mapped to the remainder of the M output ports (operation 514). Note that the matching involves an arbitration technique and the solution space that is smaller than the N input ports and the M output ports.

In some embodiments of method 500, there are additional or fewer operations. Moreover, the order of the operations may be changed, and/or two or more operations may be combined into a single operation.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An allocation circuit for a switch having N input ports and M output ports, comprising an arbitration mechanism, wherein, during a given arbitration decision cycle, the arbitration mechanism is configured to:
   maintain, until expiration, a set of mappings from a subset of the N input ports to a subset of the M output ports, wherein the set of mappings were determined during an arbitration decision cycle up to K cycles preceding the given arbitration decision cycle, based on requests for the subset of the M output ports in flits associated with packets at the subset of the N input ports; and
   match other flits associated with other packets at a remainder of the N input ports which include requests to a remainder of the M output ports so that the remainder of the N input ports is mapped to the remainder of the M output ports, wherein the matching involves an arbitration technique and a solution space that is smaller than the N input ports and the M output ports.

2. The allocation circuit of claim 1, wherein K is selected from the group including: 1, 2, 4 and 8.

3. The allocation circuit of claim 1, wherein the arbitration mechanism is implemented using a pipeline.

4. The allocation circuit of claim 1, wherein the arbitration mechanism comprises:
   a set of N input arbiters associated with the N input ports; and
   a set of M output arbiters associated with the M output ports, wherein each input arbiter in the set of N input arbiters has a set of P requesting queues corresponding to the set of M output arbiters for the flit and the other flits; and
   wherein, during the given arbitration decision cycle, the arbitration mechanism is configured to:
      determine a single flit from a group of the P requesting queues associated with the remainder of the M output ports for each of a group of the N input arbiters associated with the remainder of the N input ports; and
      select a single request from the other flits for each of a group of the M output arbiters associated with the remainder of the M output ports so that the remainder of the N input ports is mapped to the remainder of the M output ports.

5. The allocation circuit of claim 4, wherein the single request from the other flits for each of the group of the M output arbiters is selected using a round-robin technique.

6. The allocation circuit of claim 4, wherein the single flit from the group of the P requesting queues is determined using a round-robin technique.

7. The allocation circuit of claim 1, wherein the arbitration mechanism includes multiple queues corresponding to the M output ports.

8. The allocation circuit of claim 1, wherein the arbitration mechanism includes virtual output queues corresponding to the M output ports.

9. The allocation circuit of claim 1, wherein flits associated with a given packet include requests for a given one of the M output ports.

10. The allocation circuit of claim 1, wherein if, for a given one of the maintained mappings between a given input port and a given output port during the given arbitration decision cycle, there is not another flit at the given input port requesting the given output port, the arbitration mechanism is configured to provide an empty flit to the given output port.

11. The allocation circuit of claim 1, wherein if, for a given one of the maintained mappings between a given input port and a given output port during the given arbitration decision cycle, there is not another flit at the given input port requesting the given output port, the arbitration mechanism is configured to remove the mapping from the given input port to the given output port from the set of mappings.

12. A switch to selectively couple input ports to output ports, comprising:
   N input ports;
   M output ports;
   a switching mechanism configured to selectively couple the N input ports to the M output ports based on mappings provided by an arbitration mechanism; and
   the arbitration mechanism, wherein, during a given arbitration decision cycle, the arbitration mechanism is configured to:
      maintain, until expiration, a set of mappings from a subset of the N input ports to a subset of the M output ports, wherein the set of mappings were determined during an arbitration decision cycle up to K cycles preceding the given arbitration decision cycle, based on requests for the subset of the M output ports in flits associated with packets at the subset of the N input ports; and
      match other flits associated with other packets at a remainder of the N input ports which include requests to a remainder of the M output ports so that the remainder of the N input ports is mapped to the remainder of the M output ports, wherein the matching involves an arbitration technique and a solution space that is smaller than the N input ports and the M output ports.

13. The switch of claim 12, wherein K is selected from the group including: 1, 2, 4 and 8.

14. The switch of claim 12, wherein the arbitration mechanism comprises:
   a set of N input arbiters associated with the N input ports; and
   a set of M output arbiters associated with the M output ports, wherein each input arbiter in the set of N input arbiters has a set of P requesting queues corresponding to the set of M output arbiters for the flit and the other flits; and
   wherein, during the given arbitration decision cycle, the arbitration mechanism is configured to:
      determine a single flit from a group of the P requesting queues associated with the remainder of the M output ports for each of a group of the N input arbiters associated with the remainder of the N input ports; and
      select a single request from the other flits for each of a group of the M output arbiters associated with the remainder of the M output ports so that the remainder of the N input ports is mapped to the remainder of the M output ports.

15. The switch of claim 14, wherein the single request from the other flits for each of the group of the M output arbiters is selected using a round-robin technique.

16. The switch of claim 14, wherein the single flit from the group of the P requesting queues is determined using a round-robin technique.

17. The switch of claim 12, wherein the arbitration mechanism includes one of: multiple queues corresponding to the M output ports; and virtual output queues corresponding to the M output ports.

18. The switch of claim 12, wherein if, for a given one of the maintained mappings between a given input port and a given output port during the given arbitration decision cycle, there is not another flit at the given input port requesting the given output port, the arbitration mechanism is configured to provide an empty flit to the given output port.

19. The switch of claim 12, wherein if, for a given one of the maintained mappings between a given input port and a given output port during the given arbitration decision cycle, there is not another flit at the given input port requesting the given output port, the arbitration mechanism is configured to remove the mapping from the given input port to the given output port from the set of mappings.

20. A method for determining mappings for a switch having N input ports and M output ports, wherein, during a given arbitration decision cycle, the method comprises:
   maintaining, until expiration, a set of mappings from a subset of the N input ports to a subset of the M output ports, wherein the set of mappings were determined during an arbitration decision cycle up to K cycles preceding the given arbitration decision cycle, based on requests for the subset of the M output ports in flits associated with packets at the subset of the N input ports; and
   matching other flits associated with other packets at a remainder of the N input ports which include requests to a remainder of the M output ports so that the remainder of the N input ports is mapped to the remainder of the M output ports, wherein the matching involves an arbitration technique and a solution space that is smaller than the N input ports and the M output ports.

* * * * *

UNITED STATES PATENT AND TRADEMARK OFFICE
CERTIFICATE OF CORRECTION

PATENT NO.         : 8,976,802 B2
APPLICATION NO.    : 13/840085
DATED              : March 10, 2015
INVENTOR(S)        : Koka et al.

It is certified that error appears in the above-identified patent and that said Letters Patent is hereby corrected as shown below:

Specification

In column 4, line 20, delete "blocking" and insert -- blocking. --, therefor.

Signed and Sealed this
Twentieth Day of October, 2015

Michelle K. Lee
*Director of the United States Patent and Trademark Office*